Figure 2:
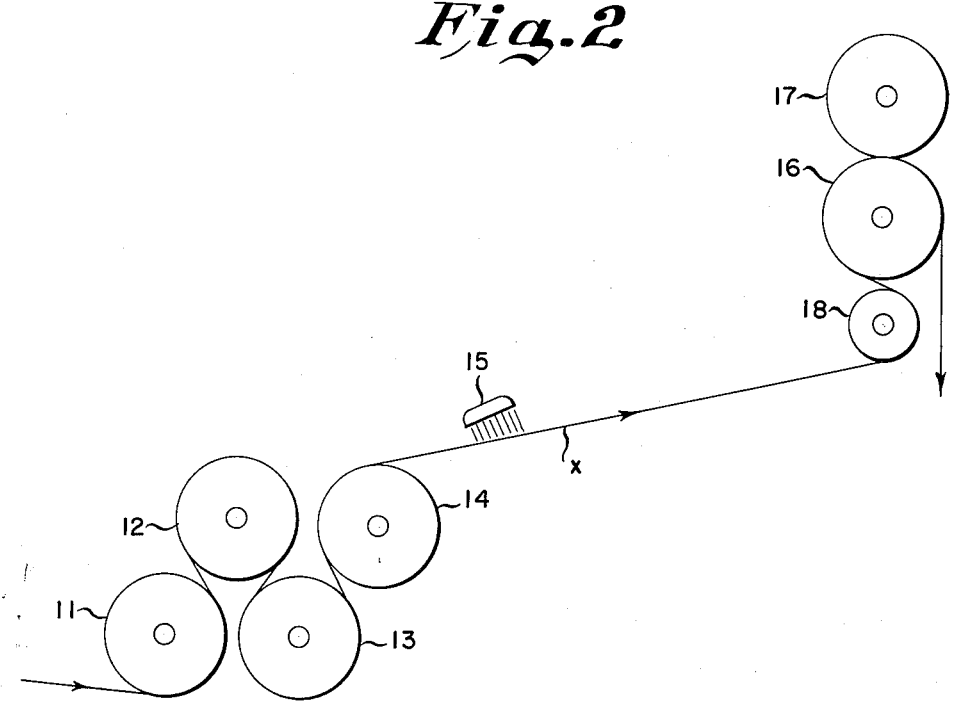

Oct. 9, 1962     M. C. TASSLER     3,057,825
POLYMERIC FILM HAVING INTEGRAL METALLIC
LUSTER AND PROCESS FOR PRODUCING SAME
Filed July 29, 1959

STRAIN—(% ELONGATION OR DRAW RATIO)

INVENTOR
MILFORD CHARLES TASSLER

BY
ATTORNEY 3,057,825
POLYMERIC FILM HAVING INTEGRAL METAL-
LIC LUSTER AND PROCESS FOR PRODUCING
SAME
Milford Charles Tassler, Circleville, Ohio, assignor to
E. I. du Pont de Nemours and Company, Wilmington,
Del., a corporation of Delaware
Filed July 29, 1959, Ser. No. 830,403
9 Claims. (Cl. 260—75)

This invention relates to the preparation of synthetic organic polymeric films. More particularly, it relates to the preparation of substantially non-fibrillating films of polymeric linear esters having a continuous integral metallic luster.

Films having a metallic luster are in great demand. They are used as a base for magnetic recording tapes, in laminates, as reflective thermal insulators and in a host of decorative uses. However, the most successful prior art processes for forming such films leave much to be desired. These processes involve laminating thin metal films to the polymeric film base or depositing metal from a gas or liquid on the base film. In either case, the resulting product suffers from problems due to poor adhesion of metal to base film and due to the tendency of the metal surfaces to be abraded easily. Furthermore, the elasticity of the resulting metal-coated film is limited by the metal surface coating.

It is an object of the present invention to produce a self-supporting polymeric film having a metallic luster without using metal of any kind. It is a further object to produce a metallic lustrous film of a polymeric linear ester that is substantially non-fibrillating under tension or flexing. (Fibrillating refers to the splitting of a film into a multiplicity of thin substantially parallel sections having the appearance of filaments or treads.) It is a still further object to produce a novel strong polyethylene terephthalate film having a continuous integral metallic luster. Other objects will appear hereinafter.

The objects are accomplished by elongating a substantially amorphous, crystallizable polymeric linear ester film in at least one direction at a temperature between the second order transition temperature of the polymer and about 50° C. above the transition temperature and, thereafter, stretching the film along its longest dimension an amount equal to the film's natural draw ratio at a temperature below the second order transition temperature of the polymer, preferably not below normal room temperature (20° C.).

In a preferred embodiment, the non-fibrillating metallic lustrous film is prepared by stretching a substantially amorphous, crystallizable polymeric linear terephthalic ester film in one direction at least two times and up to about five times its original dimension at a temperature between the second order transition temperature and about 50° C. above this transition temperature and, thereafter, stretching the film in a direction transverse to the first direction an amount equal to the film's natural draw ratio at a temperature below the second order transition temperature. Optionally, the final film may be heat-set by holding it under tension while heating the film to an elevated temperature of at least 25° C. above the temperature of the first stretching step, but below the crystalline melting temperature, usually 50–200° C. above its transition temperature, e.g. for polyethylene terephthalate, a temperature of 150°–250° C. After heat-setting, the metallic lustrous, non-fibrillating film is dimensionally stable. It should be noted that the process is easily performed in a continuous manner if the first stretching step, at the temperature above the transition temperature, is performed in a direction transverse to the direction of extrusion and the second stretching step, at the temperature below the transition temperature, is performed in the direction of extrusion (the so-called machine or longitudinal direction).

Figure 1:
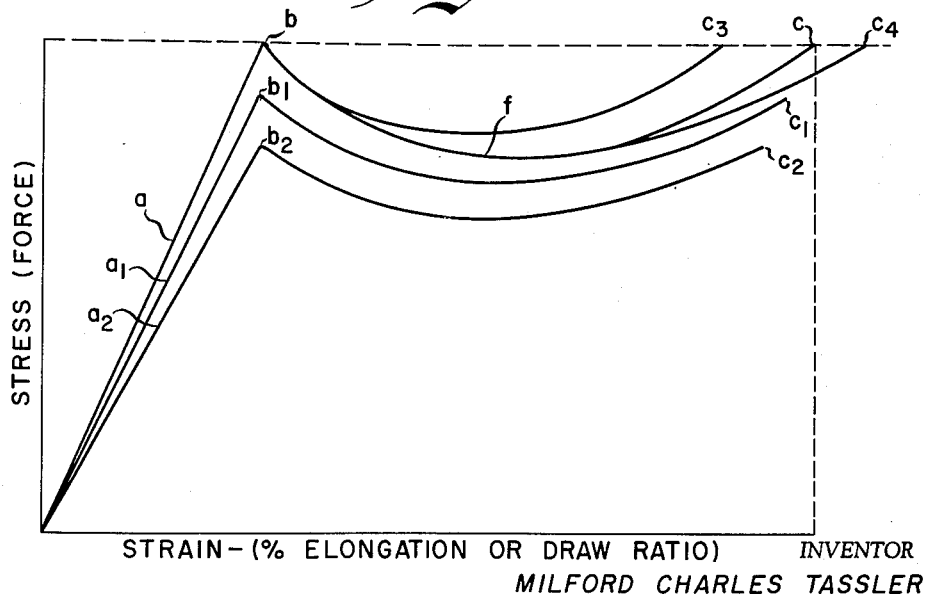

The invention will be more clearly understood by the following description when read in conjunction with the drawing, in which:

FIGURE 1 is a schematic curve illustrating how the "natural draw ratio" may be obtained and how this ratio depends on temperature and drawing speed, and FIGURE 2 is a diagrammatic illustration of one form of apparatus for carrying out the invention.

"Crystallizable polymeric linear esters" or "crystallizable polyesters," as used in this specification, refer to those synthetic linear organic polymeric esters that are obtainable in a substantially amorphous state and are capable of being converted to crystalline form upon heating to temperatures above the second order transition temperature as defined hereinafter. These polyesters are derived from glycols and dibasic acids, particularly glycols of the series $HO(CH_2)_nOH$ where $n$ is an integer within the range of 2–10, and the dibasic acid is at least one selected from the group consisting of terephthalic acid, isophthalic acid, adipic acid, sebacic acid, bibenzoic acid and the like. The invention will be described primarily as it refers to films of polyethylene terephthalate but it should be understood that the invention is applicable to films of crystallizable polymeric linear esters in general.

The "second order transition temperature" or "glass transition temperature" or merely "transition temperature," as used herein, is defined in U.S. Patent No. 2,578,-899 issued to Pace. It is the temperature at which a discontinuity occurs when a first derivative thermodynamic quantity is plotted versus temperature for the polymer. In practice, the second order transition temperature is determined by plotting a curve of linear expansion or specific heat of the polymer against temperature and noting the temperature at which a point of inflection or discontinuity in the curve occurs. This is the second order transition temperature. In the table below, the second order transition temperatures of several important crystallizable polyesters useful in the present invention are provided:

TABLE I

Second Order Transition Temperatures of Some Crystallizable Polymeric Esters

| Polymer: | Second order transition Temperature, ° C. |
|---|---|
| Polyethylene-2,6-naphthalate | 113 |
| Polytetramethylene-1,2-dioxybenzoate | 53 |
| Polyethylene-1,5-naphthalate | 71 |
| Ethylene terephthalate (70–100%)/ethylene isophthalate (0–30%) copolymer | 51–69 |
| Polyethylene terephthalate | 69 |

The "natural draw ratio," as used herein, is the ratio of film length, after elongation, to film length, prior to elongation, when a force is applied that is equal to the yield point of the film at a particular operating temperature.

The "natural draw ratio" is illustrated in FIGURE 1. As a stress or force is applied to the film, the film will strain or elongate in accordance with Hooke's law along the so-called elastic or reversible portion of the curve denoted by the letter $a$. At any point along this straight portion, release of the stress will result in the loss of elongation in the film, i.e., the film will return to its original length. When a force equal to $b$, the yield point, is reached, the film will then elongate without the application of any additional force. In fact, the force can be reduced somewhat and still the film will continue to elongate along the portion of the curve denoted by the letter $f$. However, if application of the yield point force corresponding to $b$ is continued, then the film will elongate an amount corresponding to the letter $c$ on the drawing, $c$ being the natural draw ratio of the film.

During the second elongation step while the film is being stretched an amount equal to its natural draw ratio, the film does not elongate uniformly over its entire surface from an elongation corresponding to the letter $b$ on the curve to an elongation corresponding to the letter $c$. Instead, the film, when examined, displays a line running perpendicular to the direction of elongation, from which line the stretching corresponding to an elongation of $c$ seems to emanate. For this reason, stretching under the conditions described is sometimes known as "line stretching" or "stretching from a line."

The phenomenon described above is only obtainable when stretching film of the type described herein at a temperature below its transition temperature. The natural draw ratio will, of course, depend on the yield point of the material and the shape of the stress-strain curve. The yield point will depend on the particular material used, e.g., polyethylene terephthalate or copolymers of ethylene terephthalate with ethylene isophthalate, the temperature of elongation, and the rate of elongation or "drawing speed." Thus, as the temperature is increased the yield point of the material is reduced from $b$ to $b_1$ and then to $b_2$ as shown in FIGURE 1 of the curve, and the natural draw ratios at these correspondingly higher temperatures are reduced to $c_1$ and $c_2$, respectively. As the rate of elongation is reduced, the yield point and the natural draw ratio fall.

Drawing speeds may vary anywhere from 0.75 yard/minute to as high as 50 yards/minute or higher. At the lowest drawing speed, the reinforcing region of the stress/strain curve will begin at a relatively low elongation and the natural draw ratio, $c_3$, will be correspondingly low. At the higher drawing speeds this reinforcing region will begin at a higher elongation and, hence, the natural draw ratio, $c_4$, will be higher.

Thus, for a polyethylene terephthalate film drawn at a temperature of 50° C., the natural draw ratio will vary from about 5.2 at a drawing speed of 1.2 yards/minute to about 6.7 at a drawing speed of about 30 yards/minute. The change in the natural draw ratio due to the temperature is not as pronounced. At a drawing speed of 10 yards/minute, the natural draw ratio will vary from about 6 at a temperature just below the transition temperature of polyethylene terephthalate (about 68° C.) to about 6.7 at a temperature of 25° C. Data relating to the determination of approximate natural draw ratios for polyethylene terephthalate film are given in the following table:

TABLE II

*Natural Draw Ratio of Polyethylene Terephthalate Film at Various Temperatures and Drawing Speed*

| Drawing Speed (yds./min.) | 68° C. | 50° C. | 25° C. |
|---|---|---|---|
| 1.2 | 5.0 | 5.2 | 5.5 |
| 10 | 6.0 | 6.3 | 6.7 |
| 17 | 6.3 | 6.6 | 6.9 |
| 29 | 6.5 | 6.7 | 7.0 |

It should be understood that it is not necessary for one skilled in the art to know the natural draw ratio or the yield point of the film under the particular conditions of operation prior to operating. For the films falling within the definition of the present invention, it has been found that the natural draw ratio will fall between about 5 times (5×) and about 8 times (8×) the dimension of the film prior to the second stretching step in order to produce the metallic lustrous films of this invention. The particular natural draw ratio that should be used for the particular polyester film at the particular temperature below the transition temperature of the polyester will be evident after a minimum amount of testing during the starting-up period.

The invention will be more clearly understood by referring to the following description of a preferred mode of practicing the present invention, the example, in conjunction with FIGURE 2 of the drawing. It should be understood that the temperatures mentioned in this preferred mode and those mentioned previously in the specification are the temperatures of the film unless otherwise stated. In most cases only the ambient temperature need be measured since the film will attain this temperature almost immediately. However, when it appears that the film will not attain the ambient temperature a correction is applied so that the temperature of the film is iself being considered during all of the critical steps of the invention.

EXAMPLE

Amorphous polyethylene terephthalate, prepared in accordance with the general procedure described in U.S. Patent No. 2,465,319 issued to Whinfield and Dickson, was extruded at a temperature of 285° C. through a narrow orifice of an extrusion hopper vertically downward onto a cool drum maintained at 65° C. The gauge or thickness of the quenched film was about 12 mils.

After quenching, the amorphous, unoriented film was conducted into a closed tenter frame composed essentially of two parallel sets of tenter clips attached to continuously moving endless belts. The tenter clips grasped the edges of the film and as the film moved through the apparatus, the clips diverged to stretch the film about 3× in a direction transverse to its length. The temperature of the atmosphere surrounding the film during this transverse directional stretching was maintained between 85° C. and 95° C. The resulting film having a thickness of about 4 mils was clear and transparent.

The transparent film was then fed into the arrangement of apparatus illustrated in FIGURE 2 for stretching in the longitudinal (lengthwise) direction. The slow rolls 11, 12, 13 and 14 of the apparatus were at a temperature of about 60° C., and the film was heated to a temperature somewhat higher but below 69° C. by passing it about 4 inches under a radiant heater 15. The film moved through the slow rolls at about ½ yard/minute and the fast rolls 16 and 17 were operated at a speed of about 2.5–2.7 yards/minute to stretch the film about 5.3× in the longitudinal direction. The film stretched from a line which formed under the radiant heater 15. Film having a continuous integral metallic luster was formed adjacent to this line of stretching on the downstream side of this line as indicated by $x$ on FIGURE 2. The free span between the last roll 14 and the idler roll 18 was about 24 inches.

A sample of the film of the present invention prepared as described above was heat-set under tension at a temperature of about 200° C. by passing through heated rolls (not shown) operated at the same speed as rolls 16 and 17.

As a control, a roll of amorphous, unoriented polyethylene terephthalate film prepared in the manner previously described was continuously fed into the longitudinal stretching apparatus shown in FIGURE 2. It was heated by the slow rolls and the radiant heater to the same temperature between 60°–69° C. In this case the film was stretched about 5.5× in the longitudinal direction. Once again the film drew from the line formed under the radiant heater but the resulting film had a pearlescent appearance as distinguished from the continuous integral metallic luster of the film produced according to the present invention.

The following data in Table III show a comparison of the physical properties of the films:

TABLE III

| Property | | Film of Invention | Control |
|---|---|---|---|
| Tensile Modulus (p.s.i. ×10⁻⁵) | MD [1] | 14.2 | 12.2 |
| | TD [2] | 3.61 | 1.78 |
| Ultimate Tensile Strength (p.s.i. ×10⁻³) | MD | 57.3 | 57.7 |
| | TD | 13.1 | 4.93 |
| Elongation (percent) | MD | 5.0 | 8.3 |
| | TD | 150.0 | 78.0 |
| $F_5$ Value (p.s.i. ×10⁻³) | MD | 57.3 | 51.4 |
| Tear Strength (grams/mil) | MD | 13.7 | 3.8 |
| | TD | 6.5 | 22.6 |
| Percent Shrinkage | MD | 15.8 | 15.0 |
| | TD | 8.9 | 2.3 |
| Density (grams/cc.) | | 1.01 | 0.89 |

[1] Machine or Longitudinal Direction.
[2] Transverse Direction.

The physical properties of the heat-set film of the invention were essentially the same as the "film of invention" listed above except that the shrinkage was reduced to less than ⅓ of the shrinkage of the non-heat set "film of invention."

Ultimate tensile strength, in lbs./square inch, is based upon the initial cross-sectional area of a sample and is determined by elongating the film at a rate of 100% per minute until the sample breaks.

Percent elongation is the percent increase in length of the film at the breaking point.

$F_5$ value is the tensile strength at an elongation of 5%.

Tensile modulus, in lbs./square inch, is a measure of the film stiffness and is taken from the slope of the initial or Hookian portion of the stress/strain curve at 1% elongation, the film being elongated at 100% per minute.

Tear strength, in grams/mil of thickness, is the force required to tear the film and is measured on an Elmendorf Tear Tester.[1] The tear tester consists of a stationary jaw, a movable jaw mounted on a pendulum which swings on a frictionless bearing, and means for registering the maximum arc through which the pendulum swings. The film sample is placed between the jaws and the pendulum is released. From the point at which the pendulum stops after tearing the film the tear strength is calculated. The machine direction tear strength is directly related to the tendency of the film to fibrillate.

Percent shrinkage is a measure of the dimensional stability or the ability of the film to resist shrinkage at elevated temperatures. A film sample of known dimensions is hung unrestrained for 30 minutes in an oven maintained at about 150° C. and the dimensions remeasured.

The following test was performed to compare the fibrillation tendencies of the above films. The test consisted of placing a film sample (1″ in the MD × 1½″ in the TD) in n-propylamine contained in a vessel which was stoppered. The ratio of the weight of propylamine to the weight of film sample was greater than 300:1, and the vessel and contents thereof were maintained at room temperature. Propylamine etched the film samples in accordance with a mechanism of cleavage of the ester linkage to form the diamide of terephthalic acid and ethylene glycol, both compounds being soluble in the amine.

After 22 hours in n-propylamine the pearlescent film

[1] Manufactured by the Albert Instrument Corp. of Philadelphia, Pa.

(the control in the above example) was etched to the degree that it slit into about 16 long ribbons running in the machine direction and being about ¹⁄₁₆″ wide. In addition, the ribbons were etched with long parallel machine direction lines spaced at approximately 30 microns. This illustrates the definite tendency for the pearlescent film to fibrillate in the direction in which it was "line" drawn.

After 22 hours in n-propylamine the metallic luster film of the invention existed as a multiplicity of small pieces (about 40–50 pieces) which were irregular in shape, being defined by short transverse direction boundaries and even more irregular machine direction boundaries. This illustrates that the film did not exhibit the fibrillation tendency found in the pearlescent film.

As noted previously, the product of the present invention has a metallic lustrous appearance as compared to the pearlescent appearance of the control. This is attributable to the structural changes in the film wrought by the present process. As evidence of the structural differences between the two films, X-ray diffraction patterns of both films were obtained. These X-ray diffraction patterns were obtained with the X-ray beam directed perpendicular to the plane containing the film. The diffraction pattern of the pearlescent film (the control) was a highly axially oriented structure indicated by very short diffraction spots on the X-ray. The pattern for the metallic luster or "silverescent" film of the invention indicates that it has less axial orientation as indicated by longer streaks rather than spots on the X-ray.

The following theory is offered as an explanation of the differences in the appearances between the pearlescent and the silverescent films. The silverescence (metallic luster) as well as pearlescence is due to the formation of voids in the film as evidenced by the reduction in density upon stretching the film at a temperature below its transition temperature an amount equal to its natural draw ratio. Commercial polyethylene terephthalate film has a density of about 1.4 grams/cc. Both stretched films have a density of about 0.6–1.3 grams/cc. In more general terms, the polyester products that have been stretched at temperatures below their transition temperatures to their natural raw ratios suffer a reduction in density of about 7–60%. However, the film of the present invention which had primarily been stretched at a temperature above its transition temperature displays a tensile strength of at least 10,000 p.s.i. in both the longitudinal and transverse directions. This serves as evidence that the type, size and distribution of the voids are different in the film of the present invention from those of the control. Further evidence of these differences is manifest in the substantially non-fibrillating property of the product of the present invention. It is believed that in the pearlescent film all of the voids are elongated in shape and all voids are pointing in the direction in which the film was one-way stretched (or in the direction of enhanced properties). In the case of the metallic luster film, it is believed that the voids are elongated but that they are not all pointing in the direction of the second direction stretching step. It is also believed that the voids in the metallic luster film are smaller. In view of the fact that you are "line drawing" in the longitudinal direction a film which has already been stretched in the transverse direction, you are stretching a more closely knit structure having some crystallinity. These factors are believed to contribute to the difference in both the size of the voids and the direction in which the voids will be aligned.

The foregoing properties of the product of the present invention make it most useful in tapes of all varieties. The films of the present invention may be employed as base materials for the preparation of magnetic recording tapes, pressure-sensitive adhesive tapes, adhesive tapes, binding tapes, surgical tapes and tear tapes for opening cartons and packages. Owing to their unique structure and appearance, these films are also desirable for use in electrical applications in the form of pressure-sensitive tapes, slot insulations for motors, as a dielectric in condensers, as reflective thermal insulators, in window shades and as an insulating wrapping for wires and piping. The films may be split into very narrow ribbons for use as a "metallic" yarn to be woven or knitted into fabrics of all types. Such metallic yarn may be used in preparing attractive drapery materials, clothing, upholstering, rugs and the like. The films may also be employed in a large variety of end uses wherein metallic foil or metallized films are presently employed. These applications include use in laminated structures where a decorative effect is desired, such as in laminates to wood, metal, masonry, other polymeric films. Thicker film may also be used as fabric stiffeners, e.g. collar staps and the like. Since the application of localized pressure causes clearing of the film in these areas, the films may be employed as a tracing cloth and in other structures used in preparing photoduplications.

As for the process, it will be noted that the temperatures involved in each of the elongating steps are critical to the present invention. The first elongating step, which may be a rolling but preferably is a stretching step, is conducted between the second order transition temperature and a temperature of about 50° C. above it—for polyethylene terephthalate, about 70° C. to about 120° C. Crystallization occurs during this step. However, it is important to restrict the amount of crystallization that occurs during this step. By maintaining the temperature within the limits specified, the amount of work necessary to stretch the film in the second direction and the likelihood of injuring the film are both kept at a minimum.

The temperature at which the second elongation step, which is a stretching step, is performed determines the appearance of the ultimate film. To obtain the metallic lustrous appearance characteristic of the present invention, it is necessary that the temperature of the film be reduced to a temperature below the transition temperature, i.e. below 70° C. However, the temperature of this step should be above room temperature (20° C.). There are several factors which will affect the temperature of the film during this step and the previous elongation step. Besides the ambient temperature (the temperature of the rolls or the temperature of the surrounding atmosphere during stretching), the temperature of the film will be affected by the thickness of the film entering the step, the extent of stretch or thickness reduction imposed in the step, the speed of the rolls and the diameters of the rolls. For polyethylene terephthalate it has been found that the ambient temperature and the temperature of the film will be approximately equal during stretching steps.

The optional final heat-setting step is most conveniently performed in the same apparatus as used in the second elongating step. The temperature used must be below the crystalline melting temperature range but must be above (at least 25° C. above) the temperature of the first elongating step. For polyethylene terephthalate, whose crystalline melting temperature range starts at about 250° C., a temperature selected from about 150° C. to about 250° C. is most useful. The exposure time during this step will depend on the rate of heat transfer. Depending on the type of equipment used, it may range from a fraction of a second to about 10 seconds or higher.

The process can be applied to polymeric films to which pigments, dyes, delusterants, etc., have been added. The use of coatings on the polymeric materials prepared by the process of the present invention is also within the purview of the invention.

The invention is equally applicable to the use and production of thin and heavy gauge films. Hence, the starting material may have a thickness anywhere from 5 to 150 mils, and the material treated according to the process of the present invention may emerge with a thickness of as low as 0.2 to 5 mils.

What is claimed is:

1. A process for preparing film having a continuous integral metallic luster which comprises the steps, in sequence, of elongating a substantially amorphous, crystallizable polymeric linear ester film up to five times its original dimension in at least the direction transverse to its longest dimension at a temperature between the second order transition temperature of said polymeric film and about 50° C. above said transition temperature; and, thereafter, of stretching said film along its longest dimension an amount equal to said film's natural draw ratio at a temperature below said second order transition temperature of said polymeric film.

2. A process for preparing film having a continuous integral metallic luster which comprises the steps, in sequence, of stretching a substantially amorphous, crystallizable polymeric linear terephthalic ester film in one direction at least two times and up to five times its original dimension in said direction at a temperature between the second order transition temperature of said polymeric film and about 50° C. above said transition temperature; and, thereafter, of stretching said film in a direction transverse to the first direction of stretch an amount equal to the film's natural draw ratio at a temperature below said second order transition temperature.

3. A process as in claim 2 wherein said 2-way stretched film is heated to a temperature of at least 25° C. above the temperature of the first stretching step and below the crystalline melting temperature while being held under tension.

4. A process for preparing a polyethylene terephthalate film having a continuous integral metallic luster which comprises the steps, in sequence, of stretching a substantially amorphous, crystallizable polyethylene terephthalate film in a direction transverse to its longitudinal direction at least two times and up to five times its original width at a temperature of 70–120° C.; reducing the temperature of said film to a temperature below 70° C. and, thereafter, stretching said film in the longitudinal direction an amount equal to the film's natural draw ratio, said amount being at least five times the original length of said film.

5. A process as in claim 4 wherein said 2-way stretched polyethylene terephthalate film is heated to a temperature of 150–250° C. while being held under tension.

6. A non-fibrillating polymeric linear terephthalic ester film having a continuous integral metallic luster, said film having a density of 0.6–1.3 grams/cc. and a tensile strength of at least 10,000 lbs./square inch in both the longitudinal and transverse directions and wherein the continuous integral metallic luster is attributable to the structure of the film and not to any additives.

7. A non-fibrillating polyethylene terephthalate film having a continuous integral metallic luster, said film having a density of 0.9–1.2 grams/cc. and a tensile strength of at least 10,000 lbs./square inch in one direction and a tensile strength of at least 30,000 lbs./square inch in the direction transverse to the first direction and wherein the continuous integral metallic luster is attributable to the structure of the film and not to any additives.

8. A process for preparing a polyethylene terephthalate film having a continuous integral metallic luster which comprises the steps, in squence, of stretching a substantially amorphous, crystallizable polyethylene terephthalate film in a direction transverse to its longitudinal direction three times its original width at a temperature of 85–95° C.; reducing the temperature of said film to a temperature below 70° C.; and, thereafter, stretching said film in the longitudinal direction an amount equal to the film's natural draw ratio, said amount being at least five times the original length of said film.

9. A process as in claim 8 wherein said 2-way stretched polyethylene terephthalate film is heated to a temperature of 150–250° C. while being held under tension.

(References on following page)

References Cited in the file of this patent

UNITED STATES PATENTS

| | | | |
|---|---|---|---|
| 2,054,454 | Thies et al. | Sept. 15, | 1936 |
| 2,137,301 | Banigan | Nov. 22, | 1938 |
| 2,238,446 | Kuettel | Apr. 15, | 1941 |
| 2,352,725 | Markwood | July 4, | 1944 |
| 2,377,231 | Hayes | May 29, | 1945 |
| 2,497,376 | Swallow et al. | Feb. 14, | 1950 |
| 2,578,899 | Pace | Dec. 18, | 1951 |
| 2,823,421 | Scarlett | Feb. 18, | 1958 |
| 2,893,906 | Taylor | July 7, | 1959 |
| 2,914,436 | Nakielny | Nov. 24, | 1959 |
| 2,948,583 | Adams et al. | Aug. 9, | 1960 |